April 11, 1961 T. J. SMULSKI 2,978,861
TIME-MEASURING METHOD AND APPARATUS
Filed June 10, 1955 7 Sheets-Sheet 1

Fig.-1  Fig.-2

INVENTOR.
THEODORE J. SMULSKI
BY H P Settle, Jr.
ATTORNEY

April 11, 1961 T. J. SMULSKI 2,978,861
TIME-MEASURING METHOD AND APPARATUS
Filed June 10, 1955 7 Sheets-Sheet 2

Fig.-1A

INVENTOR.
THEODORE J. SMULSKI
BY H P Settle, Jr
ATTORNEY

Fig-3

April 11, 1961 T. J. SMULSKI 2,978,861
TIME-MEASURING METHOD AND APPARATUS
Filed June 10, 1955 7 Sheets-Sheet 4

INVENTOR.
THEODORE J. SMULSKI
BY H.P.Settle, Jr.
ATTORNEY

April 11, 1961     T. J. SMULSKI     2,978,861
TIME-MEASURING METHOD AND APPARATUS

Filed June 10, 1955                                        7 Sheets-Sheet 5

INVENTOR.
THEODORE J. SMULSKI
BY
H. P. Settle, Jr.
ATTORNEY

April 11, 1961 T. J. SMULSKI 2,978,861
TIME-MEASURING METHOD AND APPARATUS
Filed June 10, 1955 7 Sheets-Sheet 6

INVENTOR.
THEODORE J. SMULSKI
BY
H. P. Settle, Jr.
ATTORNEY

Fig.-21

United States Patent Office 2,978,861
Patented Apr. 11, 1961

2,978,861

TIME-MEASURING METHOD AND APPARATUS

Theodore J. Smulski, Gary, Ind., assignor, by mesne assignments, to The Anderson Company, a corporation of Indiana Filed June 10, 1955, Ser. No. 514,446

11 Claims. (Cl. 58—23)

This invention relates to a time-measuring method and apparatus and more particularly to a method and apparatus in which time is measured by the cooling period of a temperature-responsive means, with the motion derived from such cooling being utilized to control an indicating instrumentality.

In accordance with this invention, temperature-responsive means are provided having a physical characteristic which changes with temperature variations, the internal energy of such means is changed to vary the temperature thereof from an initial temperature to a final temperature, and the resulting change in such physical characteristic of the temperature-responsive means is utilized to control an indicating or control apparatus.

This arrangement may function as an interval timer with means controlled by the temperature-responsive means being effective for indicating a time interval, giving a signal, energizing an electrical control circuit, or actuating a valve, etc., after a predetermined adjustable time interval, or it may function as a continuous timer with means controlled by the temperature-responsive means being effective for actuating a clock mechanism, for example. Preferably, and in accordance with an important feature of the invention, when the invention is used as a continuous timer, a plurality of temperature-responsive means are cyclically operated with the rate of timer operation being controlled solely by the sequential and repetitive cooling periods of the temperature-responsive means, and the entire cyclic operation being independent of the time and energy source required for heating the temperature-responsive means prior to initiating the cooling periods. It has been found that with the use of a temperature-responsive means in this manner, the elements of the system can be very rugged in construction and unaffected by mechanical shocks and vibrations, the speed of movement and frequency of operation of the elements of the system can be relatively low to minimize friction between and fatigue of moving parts and obtain a very durable instrument, and at the same time it is possible to achieve an accurate and reliable time measurement.

Almost any substance could be used as the temperature-responsive means since all substances can have a physical characteristic which changes with changes in temperature. Preferably, the changing physical characteristic is a mechanical deformation and the temperature-responsive means is in the form of a bimetal warp device which can be designed to achieve a relatively large and readily controlled mechanical deformation. Also, as will be pointed out, it is possible to readily and accurately compensate for changes in ambient temperature with such a device.

The change in internal energy of the temperature-responsive means may be effected in many different ways, but according to an important feature of this invention, it is different than the temperatures of surrounding structures and substances (ambient temperature) and allowing transfer of energy from the temperature-responsive means to such surrounding structures and substances to change the temperature of the temperature-responsive means to a final temperature intermediate the initial and ambient temperatures. In this case, the rate of transfer of heat energy is determined by the temperature of the temperature-responsive means, the ambient temperature and the physical make-up and relation of the component elements.

The ambient temperature can be virtually unsusceptible to sudden changes, and the physical make-up and relation of the elements may be very stable over extremely long periods of time, so that the time interval required for the change from the initial temperature to the final temperature is reliably and precisely determined by the initial and final temperatures of the temperature-responsive means relative to the initial ambient temperature.

It may be noted that if the initial temperature is intermediate the ambient temperature and the final temperature, energy has to be transferred to or from the temperature-responsive means from a suitable source during the timing interval, which introduces additional factors difficult to accurately control.

Since heating is generally more readily effected than cooling, the initial and final temperatures are both preferably above ambient temperature and, in the preferred case, in which the final temperature is intermediate the initial and ambient temperatures, the initial temperature is higher than the final temperature and the timing interval is therefore determined by cooling rather than by heating of the temperature-responsive means. Preferably, the present invention thus contemplates the use of temperature-responsive means which is initially heated then cooled with the rate of operation of the timer being determined by the cooling time alone.

In one preferred form of the invention, as in a continuous timer or clock, a pair of temperature-responsive means are cyclically operated with the rate of timer operation being controlled by the cooling time of one means plus the cooling time of the other, and being independent of the heating times. For this purpose, one means is heated while the other cools and vice versa, the heating time of each means being not greater and preferably substantially less than the cooling time of the other. One specific feature of the invention is in an electrical circuit arranged for obtaining such alternate operation of a pair of temperature-responsive means, for example, two bimetallic elements, each of which is heated and maintained at a predetermined higher temperature while the other means cools from such higher temperature to a lower temperature at which it actuates the circuit to discontinue heating of the first element, thus starting the cooling or timing period of the first element, and to initiate heating of the second element.

Another feature of the invention is an automatic compensation for changes in ambient temperature. According to this feature, the temperature difference of the temperature-responsive means from the start to the finish of the timing interval (i.e., between the initial and final temperatures) is automatically varied as the ambient temperature changes, so as to maintain a constant cooling time.

The operation of the timer is, of course, controlled by variations in a physical characteristic of the temperature-responsive means. Auxiliary temperature-responsive means having a similar physical characteristic changing with changes in ambient temperature are coupled to the time-controlling temperature-responsive means in a manner such as to maintain a predetermined high or initial temperature value.

A specific feature of the invention is in the means for heating the temperature-responsive means and supplying energy thereto. According to this feature, the temperature-responsive means is heated from an electrical heating coil and, because most electrical power supplies are subject to wide voltage variations, means are provided for regulating the current flow through such heating coil to maintain a predetermined initial temperature of the temperature-responsive means. Such regulating means preferably comprises a control heating coil in circuit with the heating coil for the temperature-responsive means, the control heating coil being arranged to heat a temperature-responsive element, such as a bimetallic element, which in turn controls intermittently operated contacts in circuit with the coils and the supply, which may be a battery, with the percentage of time that such contacts are closed being controlled by the control heating coil to maintain a predetermined initial temperature of the temperature-responsive means despite any fluctuations in the supply voltage.

Still another feature of the invention is in the provision of means for mechanically actuating a timer mechanism in response to cyclic operation of a temperature-responsive means.

It is accordingly a general object of this invention to provide an improved time-measuring method and apparatus in which time is measured by flow of heat energy from a temperature-responsive means.

A more specific object of this invention is to provide time-measuring methods and apparatus in which time is measured by the time interval required for cooling of temperature-responsive means from one temperature to another.

Another object of this invention is to provide an improved time-measuring method and apparatus in which a pair of temperature-responsive means are cyclically operated with time measure in accordance with the cooling time of one means plus the cooling time of the other.

Still another object of the invention is to provide improved time-measuring methods and apparatus in which the time measurement is substantially independent of ambient temperature variation over a wide range.

Another object of the invention is to provide improved time-measuring apparatus including cyclically operated temperature-responsive means, and means for mechanically actuating a timer mechanism in response to the cyclic operation of such means.

Still another object of this invention is to provide improved time-measuring methods and apparatus in which electrical contacts are cyclically operated and adapted to give a remote indication.

Yet another object of this invention is to provide improved time-measuring apparatus operated from an electrical power supply, with the operation of the apparatus being substantially independent of variations in the voltage of the supply and other factors.

This invention contemplates other and more specific objects, features, and advantages which will become more fully apparnet from the following detailed description taken in conjunction with the accompanying drawings which illustrate a preferred embodiment and in which.

Several forms of timers are shown in the drawings, and all of these timers operate in accordance with the principles hereinbefore set forth. Since the device shown schematically in Figure 1A represents a relatively simple form of the timer of the present invention, this device will be first described in detail to explain the fundamental operation of my invention.

Figure 1:
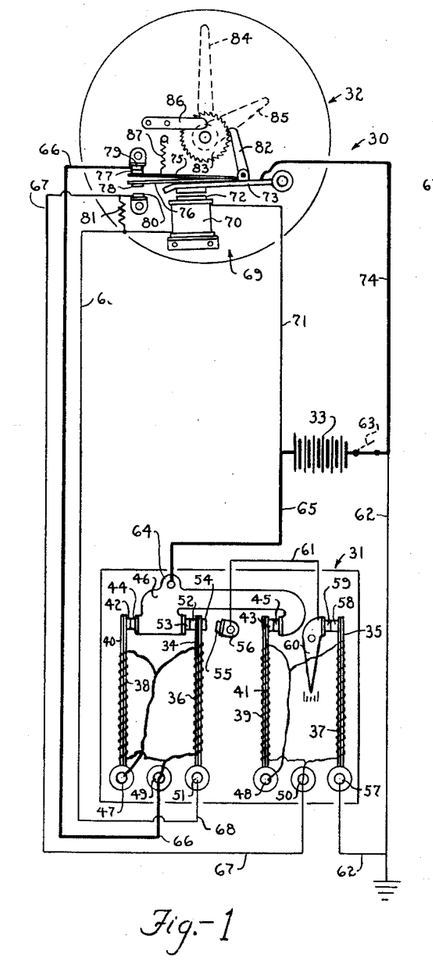
Figure 1 is a schematic electrical and mechanical diagram of a modified form of timer constructed according to the principles of this invention.
Figure 1A:
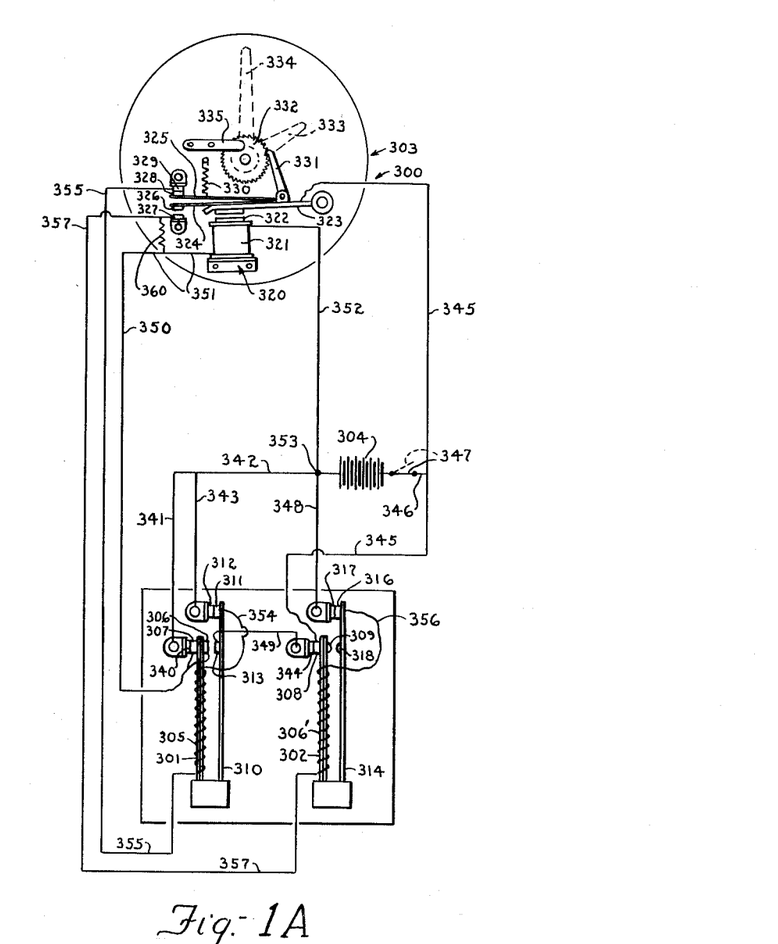
Figure 1A is a schematic electrical and mechanical diagram of a timer constructed in accordance with the principles of this invention.

Structure of the embodiment of Figure 1A

In Figure 1A, reference numeral 300 refers generally to a register or indicator of the continuous clock type using two temperature-responsive elements 301 and 302 which constitute a part of a control circuit of the present invention. The control circuit also includes an indicator unit 303 and a source of electrical power, either direct current or alternating current, shown by way of example as a battery 304.

The temperature-responsive elements 301 and 302 preferably take the form of bimetallic warp strips, each of which is cyclically heated and cooled with the indicator 303 being operated at a rate proportional to the cooling time of one strip 301, 302 plus the cooling time of the other strip 301, 302, in accordance with the principles of the present invention. To heat the strips 301, 302, coils 305, 306', respectively, of insulated resistance material are wound thereabout; and the coils 305 and 306' will apply heat energy to the bimetal strips 301, 302 to maintain the strips at a predetermined initial elevated temperature. The heating of the strips will cause them to warp in a clockwise direction, as the strips are viewed on the drawing, Figure 1A.

It will be noted that the strip 301 is provided at its outer end with oppositely directed terminals 306 and 307, while the strip 302 is provided with a single terminal 308 and with a nonconductor bumper or the like 309 on its opposite face. Immediately adjacent the strip 301 is an inherently resilient contact arm 310 normally self-biasing in a counterclockwise direction, so that a terminal 311 at the extreme end thereof contacts a terminal 312 forming a part of the control circuit, as will be later described in detail. The contact arm 310 carries intermediate its length an additional terminal 313 which is adapted to be contacted by the bimetallic strip terminal 306 as the bimetallic strip 301 is warped in its clockwise direction, as by the application of heat energy through the coil 305. Immediately adjacent the other bimetallic warp strip 302 there is positioned a similar inherently resilient contact arm 314 which bears at its free or upper end a contact 316 which cooperates with a similar contact 317 forming a part of the control circuit. The arm 314 is provided intermediate its length with a nonconductive bumper 318 which cooperates with the bumper 309 as the bimetallic warp strip 302 is biased in its clockwise direction by the application of heat energy through the coil 306'.

It will be noted that the contacts 311—312 are normally closed by the inherent resiliency of the arm 310, while the contacts 316 and 317 are also normally closed by the inherent resiliency of the arm 314. The bimetallic warp strips 301 and 302 both move clockwise on the application of heat energy through their respective coils 305, 306', and when the strips are so moved the contacts 311 and 312 are opened by movement of strip 301, while contacts 316, 317 are opened by strip 302 against the inherent resiliency of the respective resilient arms 310 and 314.

The indicator 303 includes an electromechanical device 320 comprising a coil 321 forming a solenoid winding surrounding a suitable core 322 of magnetic material which is arranged to attract a pivotal armature 323 of magnetic material when the coil 321 is energized. The armature 323 carries a pair of switch blades 324 and 325. The lower blade 324 carries a contact 326 engageable with a fixed contact 327 when the coil 321 is energized and the armature 323 is attracted by the coil. The upper switch blade 325 carries a contact 328 which engages with a fixed contact 329 when the coil 321 is de-energized and the armature 323 is in its raised position under the influence of a tension spring 330.

The electromagnetic device 320 also serves to actuate the indicator 303 through a pawl 331 carried by the movable armature 323 and having a toothed upper end engageable with the peripheral teeth of a ratchet wheel 332. When the coil 321 is energized to move the armature 323 from its illustrated raised position, the wheel 332 will be rotated through a certain angle. Rotation of the wheel 332 may be used for any desired purpose. It may, for example, be used to effect rotation of the clock hands 333 and 334 in a manner to be described in detail hereinafter. To prevent free rotation of the wheel 332, a leaf spring element 335 is placed in frictional engagement with the wheel 332.

Now that we have described in detail the mechanical elements which constitute the device 300 illustrated in Figure 1A, we shall now proceed to describe the circuits which coordinate and control the operation of the bimetallic warp elements 301, 302 and the indicating device 303.

The bimetal 301 is illustrated in Figure 1A in its normal position at which the contact 307 is in electrical contact with a terminal 340 which, in turn, is connected through a conductor 341, and a second conductor 342, and a connection point 353 to one side of the source or battery 304. The terminal 312, which is normally contacted by the terminal 311 at the end of the resilient arm 310, is likewise connected to the battery through a line 343 which connects with the conductor 342. The contact 308 on the warp strip 302 is connected through a conductor 345 and a second conductor 346 to the other side of the battery. An initiating or starting switch 347 is interposed in the conductor 346, this switch normally being closed and being opened only when the entire device is rendered inoperable. The conductor 345 continues on beyond the branch or battery line 346 and is connected to the armature 323.

The terminal 317, which is normally in contact with terminal 316 carried by the resilient arm 314, is connected to the other side of the battery by a conductor 348 which is joined to the connection point 353 and hence to the battery. The medial contact 313 on the resilient arm 310 is connected to the terminal 344 through a conductor 349. The contacts 306 and 307 on the opposite sides of the bimetallic element 301 are connected through a conductor 350 and a second conductor 351 to the solenoid coil 321. The other side of the coil 321 is connected through a line 352 to the left side of the battery 304 through the connection point 353. The connection point 353 thus connects the battery 304 to the conductor 348 for the contact 317, the conductor 342 which is common to the conductors 341 and 343, and the conductor 352 to the coil 321.

The heating coil 305 for the bimetal 301 is connected to the left side of the battery through the connection point 353, lines 342, 343, contacts 312 and 311, and a conductor 354. The coil 305 is also in circuit to the other side of the battery through a conductor 355 to the upper armature contact 329. When the contact 329 is closed by the contact 328 on the blade 325, the conductor 355 is connected to the other side of the battery through the conductors 345 and 346 at the switch 347.

The heating coil 306' for the bimetal 302 is connected to the battery through connection point 353 and the conductor 348, contacts 317 and 316, and conductor 356. The coil circuit can be completed to the lower armature terminal 327 through the conductor 357 and, when the solenoid coil 321 is energized, through the closed terminals 327—326, the armature arm 324, the armature 323 and the conductor 345 to the other side of the battery.

*Operation of the embodiment of Figure 1A*

To initiate the operation of the timer illustrated in Figure 1A, the switch 347 is moved from its dotted open position to its solid closed position.

The closing of this switch will initiate a circuit, which is normally closed, from the left side of the source or battery 304 and the connection point 353, conductors 342 and 343, contacts 312 and 311, conductor 354, coil 305, conductor 355, armature contacts 329 and 328, armature 323 and conductor 345, conductor 346, and switch 347 to the other side of the battery 304.

This circuit will be energized to effect heating of the coil 305, since the solenoid coil 321 will not be energized and the armature contacts 328 and 329 will be closed by the action of the tension spring 330 on the upper resilient blade arm 325 of the armature. As a result of the heating of the coil 305 by the circuit just described, the bimetal element 301 will be warped in a clockwise direction until the contact 306 comes in electrical engagement with the contact 313 on the resilient arm 310.

Closing of the contacts 306 and 313 will close a circuit from the right-hand side of the battery 304 and through switch 347 and conductors 346 and 345 to the contact 308 on the bimetal 302. Since the bimetal 302 is cold, the contact 308 will be in engagement with the fixed contact 344 which is connected through conductor 349 with contact 313. The contact between the terminals 313 and 306 will pass current through the conductor 350 and conductor 351 to the solenoid winding or coil 321 and from the winding 321 through the conductor 352 to the connection point 353 on the other side of the battery 304.

The circuit is thus completed through the winding 321 of the solenoid 320 which will attract the armature 323 to open the contacts 328 and 329 to interrupt the heating circuit for the bimetal 301. Simultaneously, the contacts 326 and 327 will be closed to set up a heating circuit for the bimetal 302 starting from the left-hand side of the battery 304 through the contact point 353 and conductor 348 to the closed contacts 316, 317 and through the conductor 356 to the coil 306' for the bimetal 302, and hence through conductor 357, contacts 326 and 327, the armature blade 324 and the armature 323 through conductor 345 and conductor 346 and the switch 347 to the right-hand side of the battery 304. As soon as the contact points 328 and 329 are opened, the bimetal 301 begins to cool and the portion of the control cycle which may be attributed to the cooling period of the bimetal 301 is now commenced. At the same time, the bimetal 302 is being heated, so as to be prepared for assuming its portion of the control cycle during its cooling period. As the bimetal 302 is heated, it is warped in a clockwise direction until the bumper 309 on the bimetal comes into contact with the bumper 318 on the resilient arm 314. Further warping movement of the bimetal 302 will force resilient arm 314 to the right to such an extent that the contact 316 will be moved to the right, i.e., away from the contact 317. Once the contact has been broken between the elements 317 and 316, the heating circuit for the bimetal 302 is broken. Of course, the bimetal 302 then begins to cool and will move counter clockwise until the contacts 316—317 are closed. At this time, the heating circuit will again be established to again heat the bimetal 302 to open the contacts 316, 317, thus interrupting the heating circuit. This action of the bimetal 302, in conjunction with the resilient arm 314, will result in the maintaining of the bimetal 302 at a substantially uniform elevated temperature, thus accurately determining the point of initiation of the cooling phase of the bimetal 302.

Cooling of the bimetal 301 will take place as hereinbefore described until the bimetal has cooled sufficiently to close the contacts 307 and 340. At this stage of the operation, the bimetal element 302 has already been heated to its elevated or initial temperature and has been maintained at this elevated temperature by the cooperation of the bimetal 302 and the arm 314 as already described. When the bimetal 301 has cooled sufficiently to close the contacts 307—340, the winding 321 for the solenoid 320 is shorted out by a circuit from the left-hand side of the battery at contact point 353, conductors 342 and 341, conductors 350 and 351, the coil 321 and conductor 352. This shorting of the relay occurs since the contact points 306 and 313 are open while the contact points 307 and 340 are closed. Shorting the relay will release the armature 323 for upward movement under the influence of the spring 330, thus opening the heating circuit for the bimetal element 302 and simultaneously closing the heating circuit for the bimetal element 301 through the closed armature contact 328.

The cooling time of the bimetal 302 contributes to the timing cycle, while the bimetal element 301 is being heated by current passing through the bimetal coil 305. As has already been explained, the heating cycle for either of the bimetal elements 301—302 is appreciably shorter than the cooling time for the other of the elements. Thus, the element 301 will be heated to an elevated temperature so as to be warped in a clockwise direction prior to the complete cooling of the element 302.

When the element 301 attains the desired elevated or initial temperature, it will move clockwise until contact 306 abuts contact 313 on the resilient arm 310. Further warping of the bimetal 301 will open the contacts 311 and 312 to interrupt the heating circuit. When the heating circuit is interrupted, the element 301 will cool to again allow contacts 311—312 to close to reestablish the heating circuit. This cycle of establishing and interrupting the heating circuit for the bimetal element 301 will result in maintaining the bimetal at the desired initial or elevated temperature.

It will be recalled that during the description of the initiation of the timing cycle, the attainment of the elevated temperature by the bimetal 301, closed contacts 306 and 313 was effective to actuate the relay coil 321. However, during the timing cycle, as has just been described, the contacts 306 and 313 will be closed without establishing a circuit through the solenoid coil 321 until such time as the bimetal 302 has cooled sufficiently and closed the contacts 308, 344.

This difference between the initiating or starting cycle and the operating and timing cycle is in the sequence of operation of the contacts 306, 313 and 308, 344. In starting, the closure of the contacts 306—313, by heating of the element 301, will immediately energize the solenoid winding 321 since the contacts 308—344 will be closed to complete the circuit, inasmuch as the bimetal 302 is cold at this time. However, during the operating or timing cycle, the heating period for the bimetal 301 is substantially less than the cooling period for the bimetal 302 and the energizing circuit to the solenoid winding 321 will not be complete until the bimetal element 302 is cooled sufficiently to close the contacts 308 and 344. In other words, during the initiation of the timing cycle, the heating of the bimetal element 301 actuates the relay 320 to cause operation of the timing device 303 by rotating the wheel 332. During the timing cycle itself, i.e., after the cycle has once been initiated, actuation of the relay 320 to cause intermittent rotation of the wheel 332 is due to cooling of the bimetal element 302. Thus, after the timing cycle has been initiated, the solenoid 320 is energized by cooling of the element 302, and the solenoid 320 is de-energized in response to cooling of the bimetal element 301.

One more auxiliary circuit which is utilized during the timing cycle is a holding circuit through the coil 321 whenever the contacts 326 and 327 are closed. This circuit is independent of the supply of heating current to the bimetal coil 306', so that the solenoid will be held energized despite the making and breaking of the heating circuit for the coil 302 due to opening and closing of the contacts 316, 317 to maintain a constant elevated temperature in the bimetal 302. This holding circuit runs from the right-hand side of the battery 304 through the switch 347 and the conductors 346 and 345 to the armature 323, through the armature blade or arm 324 and contacts 326, 327 to resistor 360, conductor 351, coil 321 and conductor 352 to the connection point 353 at the left-hand side of the battery 304.

From the foregoing detailed structural and operational explanation of the present invention, it will be appreciated that the device illustrated in Figure 1A of the drawings provides an accurate timing mechanism which, in essence, depends upon the cooling period of a pair of temperature-responsive or bimetallic elements to time the operation of an indicating device 303. After the cycle has once been initiated, the solenoid 320 is actuated whenever the bimetallic element 302 cools sufficiently to close the contacts 308—344 to pull the armature 323 downwardly to close a holding circuit for the solenoid. The solenoid remains energized throughout the cooling period of the bimetal element 301, at the conclusion of which the closing of the contacts 307, 340 short circuits the solenoid 320 to interrupt actuation of the solenoid, thereby releasing the armature 323 for movement under the influence of the spring 330. The solenoid remains inactive during the entire cooling period for the bimetal 302, at the conclusion of which the solenoid is again energized. Each energization of the solenoid 320 will cause movement of the toothed wheel 332 through one increment of its rotation, while de-energization of the solenoid 320 will cause ratcheting movement of the pawl 331 to grasp the toothed periphery of the wheel 332 for the next subsequent incremental movement.

Therefore, it will be seen that the operation of the timing device illustrated in Figure 1A is dependent upon cyclic operation timed in accordance with the cooling periods of the bimetal elements 301 and 302. The cooling periods of these bimetal elements are entirely independent of the voltage supply from the source 304. When the timing device, as illustrated in Figure 1A, is utilized in connection with an indicating device 303, which is preferably an automobile clock, the cyclic operation of the indicating device is truly independent of the voltage of the battery 304. This is highly desirable inasmuch as the voltage output of the battery 304 may vary as much as fifty percent in an average automobile installation in which the battery is periodically charged by the automobile generator. Thus, I have eliminated the major cause of inaccuracy in previous automobile clocks.

In order to further increase the accuracy of the timing device shown in Figure 1A, the use of the resilient arms 310 and 314 and the interruption and re-establishment of the heating cycles for the respective bimetallic elements 301 and 302 through the use of the contact points 311, 312 and 316, 317 insures the initiation of the cooling cycle from the substantially constant initial temperature. For calibration, the contacts 340, 344, 312 and 317 are preferably adjustable to set the initial and final temperatures for each portion of the cycle attributable to the respective bimetallic elements 301 and 302. Other variations in the cooling cycle due to variations in ambient temperature may be taken care of in a manner to be hereinafter explained during the more detailed explanation of different embodiments of the present invention.

Figure 2:
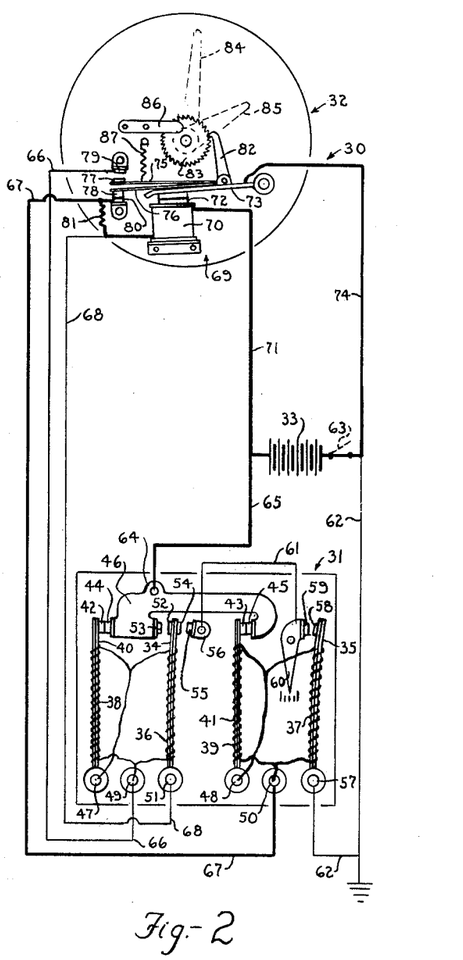
Figures 2 and 3 are diagrams similar to Figure 1 but with certain elements in different positions.
Figure 3:
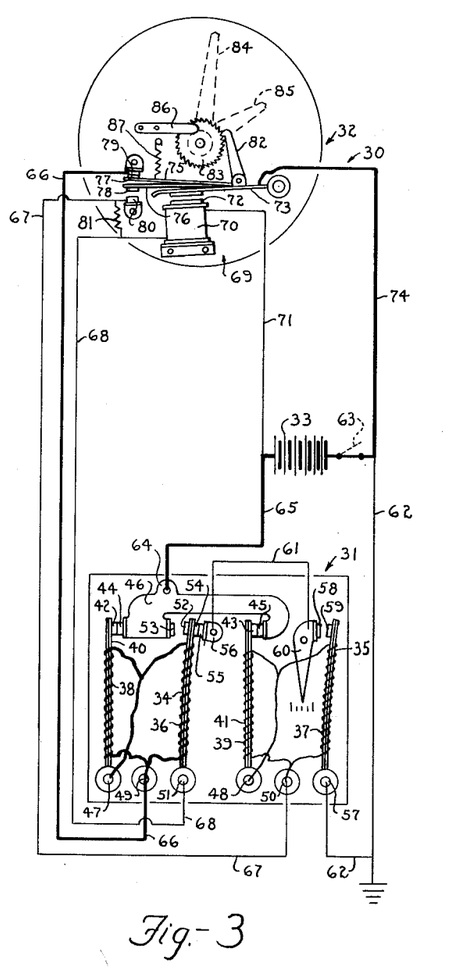

Structure of the embodiment of Figures 1–3

In that embodiment of the invention shown schematically in Figures 1–3, reference numeral 30 generally designates a timer constructed in accordance with the principles of this invention. The timer 30 includes a control unit 31 which may be electrically connected to an indicator unit 32 and a source of electrical power such as a battery 33.

The control unit 31 comprises a pair of temperature-responsive means in the form of bimetallic warp strips 34 and 35 each of which is cyclically heated and cooled with the indicator 32 being operated at a rate proportional to the cooling time of one strip plus the cooling time of the other, in accordance with the principles of this invention, as hereinbefore explained in connection with Figure 1A.

To heat the strips 34 and 35, coils 36 and 37 of insulated resistance material are wound therearound and are heated by electrical current from the source 33 to apply heat energy to the bimetal strips 34 and 35.

For this purpose, the coils 36 and 37 are connected in circuit with, preferably in parallel with, a pair of coils 38 and 39 of insulated resistance material which are wound around a second pair of bimetal strips 40 and 41. The strips 40 and 41 carry contacts 42 and 43 which are normally engaged with contacts 44 and 45 carried by a plate 46. The regulator bimetal strips 40 and 41 may be electrically connected to terminals 47 and 48 and the coils 36 and 38 are connected between the terminal 47 and a terminal 49 with the coils 37 and 39 being connected between the terminal 48 and a terminal 50.

In operation, if a voltage is applied between the plate 46 and the terminal 49, there will be a path of current flow through the contacts 44, 42 through the bimetal 40 to the terminal 47 and from there through the coils 36, 38 to the terminal 49. This current will develop heat at the coils 36, 38 which will be transferred to the bimetal strips 34, 40 and if the current is higher than a certain value, the bimetal 40 will be warped to an extent sufficient to disengage the contact 42 from the contact 44. Assuming that the circuit is not otherwise completed, the current flow through the coils 36—38 will cease. The bimetal strips may, however, continue to heat for a certain length of time due to a lag between the development of heat at the coils and transfer thereof to the bimetals, so that the contact 42 may move further away from the contact 44. Ultimately, however, the heating of the strips will cease, and the strips will start to cool, allowing the contact 42 to move back into engagement with the contact 44, after which the cycle will be repeated.

As long as the voltage applied between plate 46 and terminal 49 is higher than that required to achieve a current flow through the coil 38 sufficient to disengage the contacts 42, 44, the cycle will be repeated at a relatively rapid rate, and the temperature of the bimetal 40 will remain substantially constant at an elevated temperature over any appreciable period. Since the coil 36 is in parallel with the coil 38, the bimetal 34 will also be heated, and in the same manner, by the coil 36, assuming that the resistances of the coils remain in substantially fixed proportion.

When a voltage is applied between the plate 46 and the terminal 50, the coil 39 and bimetal 41 will function in a similar manner to develop a heat energy in the coils 37 and 39 to heat the bimetals 35 and 41 to a constant and predetermined elevated temperature.

As above indicated, the bimetals 34 and 35 are cyclically heated and cooled, with the indicator 32 being operated at a rate proportional to the time of cooling of one strip plus the time of cooling of the other. For this purpose, the bimetal 34 is connected to a terminal 51 and carries a contact 52 engaged with a contact 53 carried by the plate 46 when the bimetal strip 34 is cool, and the bimetal 34 carries a contact 54 engageable with a contact 55 carried by a bracket 56 when it is heated to a certain extent. The bimetal 35 is connected to a terminal 57 and carries a contact 58 engaged with a contact 59 carried by an adjustably pivotal member 60 when the bimetal 35 is cool.

The pivotally adjustable member 60 is connected through a conductor 61 to the bracket 56; the terminal 57 is connected through a conductor 62 and through a switch 63 to the right-hand side of the source 33; a terminal portion 64 of the plate 46 is connected through a conductor 65 to the left-hand side of the source 33; and the terminals 49, 50 and 51 are respectively connected through conductors 66, 67 and 68 to an electromechanical device 69 at the indicator 32, the device 69 being preferably arranged to perform the dual function of acting as a relay and as a means for actuating the mechanism of the indicator 32.

The electromechanical device 69 comprises a coil 70 having one end connected to the conductor 68 with its other end connected through a conductor 71 to the left-hand side of the source 33, the coil 70 being wound on a suitable core 72 of magnetic material. The armature 73 is electrically connected through a conductor 74 and through the switch 63 to the right-hand side of the source 33 and carries a pair of blades 75 and 76 which respectively carry contacts 77 and 78 engageable with fixed contacts 79 and 80, respectively.

When the coil 70 is de-energized, the contact 77 will be engaged with the contact 79 as illustrated in Figure 1, while when the coil 70 is energized, the contact 78 will be engaged with the contact 80 as illustrated in Figure 2. The contacts 79 and 80 are connected to the conductors 66 and 67, respectively. Accordingly, the device 69 functions as a relay to selectively connect the conductor 74 with either the conductor 66 or the conductor 67. It may be here noted that the conductor 67 is connected throught a resistor 81 to the conductor 68 for a purpose to be described hereinafter.

In addition to functioning as a relay, the device 69 may mechanically actuate the indicator 32. For this purpose, the armature 73 carries a pawl 82 arranged to engage the toothed periphery of a ratchet wheel 83, so that when the coil 70 is energized to move the armature 73 from the position of Figure 1 to the position of Figure 2, the wheel 83 will be rotated through a certain angle. Rotation of the wheel 83 may be used for any desired purpose and may, for example, be used to effect rotation of clock hands 84 and 85 in a manner as will be described in detail hereinafter. To prevent free rotation of the wheel 83, a member 86 may be provided in frictional engagement therewith. It should be noted that the armature 73 is urged toward the position of Figure 1 by a suitable tension spring 87.

Operation of the embodiment of Figures 1–3

To initiate operation of the timer 30, the switch 63 is moved from an open position to a closed position as illustrated. A circuit will then be completed (Figure 1) from the right-hand side of the source 33 through the switch 63, conductor 74, armature 73, blade 75, contacts 77, 79 and conductor 66 to the terminal 49 of the control unit 31, and from the terminal 49 through coils 36, 38 in parallel to the terminal 47, and from there through the bimetal 40, contacts 42, 44 plate 46 and conductor 65 to the left-hand side of the source 33.

This will energize the coil 38 in a manner as previously described and if the voltage of the source 33 is above a certain value, the bimetal 40 will operate to intermittently engage and disengage the contacts 42, 44 to maintain the bimetals 34 and 40 at a substantially constant and predetermined elevated temperature.

The bimetal 34 will then be heated by the coil 36 and will be warped to move the contact 54 toward the contact 55. When the contact 54 engages the contact 55 (Figure 3), a circuit will be completed from the right-hand side of the source 33 through the switch 63, through the conductor 62 to the terminal 57, and from terminal 57 through bimetal 35, contacts 58, 59, conductor 61, contacts 55, 54, bimetal 34 to terminal 51, and from terminal 51 through conductor 68, coil 70 and conductor 71 to the left-hand side of the source 33. The relay coil 70 will then be energized and armature 73 will be moved from the position of Figure 1 to the position of Figure 2 to engage contacts 78 and 80 and disengage contacts 77 and 79. Disengagement of the contacts 77 and 79 will de-energize the coils 36—38 and bimetal 34 will start to cool to move the contact 54 away from the contact 55 as shown in Figure 2. This will open the energizing circuit for the coil 70 described above, but the coil 70 will remain energized to an extent sufficient to maintain the armature 73 in the position of Figure 2, due to a holding circuit from the right-hand side of the source 33, through the switch 63, conductor 74, armature 73, blade 76, contacts 78, 80, resistor 81, coil 70 and conductor 71 to the left-hand side of the source 33.

At this point, the coils 37—39 are energized (Figure 2) through a circuit from the right-hand side of the source 33 through switch 63, conductor 74, armature 73, switch blade 76, contacts 78, 80, conductor 67 to terminal 50 of the unit 31, and from terminal 50 through the coils 37, 39 in parallel, to the terminal 48 and from the terminal 48 through bimetal 41, contacts 43—45, plate 46 and conductor 65 to the left-hand side of the source 33.

If the voltage of the source 33 is above a certain value, the bimetal 41 will not function to intermittently engage and disengage the contacts 43—45 and maintain the bimetals 35 and 41 at a predetermined elevated temperature through the coils 37—39, in the same manner as described in detail above in connection with the bimetal 40.

When the bimetal 35 attains this elevated temperature, the bimetal 35 will be warped to a position as illustrated in Figure 2, to move the contact 58 away from the contact 59. The operation is preferably such that the bimetal 35 is fully heated a substantial length of time prior to the time when the bimetal 34 is cooled to an extent sufficient to engage the contact 52 with the contact 53.

After a certain length of time, the bimetal 34 will be cooled to an extent sufficient to engage the contact 52 with the contact 53. This will short out the coil 70 and in particular, one end of the coil will be connected through the conductor 68 to terminal 51 from terminal 51 through bimetal 34, contacts 52, 53, plate 46, conductor 65 and conductor 71 to the other side of the coil 70. The coil 70 will thus be de-energized, but it will be noted that there will not be a dead short across the source 33 due to the provision of the resistor 81.

De-energization of the coil 70 will allow the armature 73 to return to the position of Figure 1 and will again energize the circuit through the coils 36—38 while cordingly, the bimetal 34 will start heating and the bi-metal 35 will start cooling in a manner as previously described.

After a certain length of time, the bimetal 35 will cool to an extent sufficient to engage the contact 58 with the contact 59, which will complete a circuit previously described to energize the coil 70. This will de-energize the coils 36—38 and reenergize the coils 37—39 to initiate another cycle and the cycle will be repeated over and over again with the length of each cycle determined by the cooling time of the bimetal 34 plus the cooling time of the bimetal 35 and with the coil 70 being energized and de-energized during each cycle, the pawl 82 functioning to rotate the ratchet wheel 83 a certain amount during each cycle.

To summarize the operation, the coil 70 is energized when the bimetal 35 is cooled to an extent sufficient to engage contacts 58, 59 and remains energized until the bimetal 34 is cooled to an extent sufficient to engage the contacts 52, 53, the bimetal 34 being heated during the cooling period of the bimetal 35, and vice versa.

The coil 70 is energized, but only during the initiation of the operation, by heating of the bimetal 34 sufficiently to close contacts 54, 55. However, during sustained operation of the device, the coil 70 is energized by cooling of the bimetal 35 sufficiently to establish the identical circuit by closing contacts 58, 59. The significance of this alternate method of energization of the coil 70 during starting will be appreciated from the description of the same type of operation in connection with the embodiment of Figure 1A.

*Structure and operation of the embodiment of Figures 6–21*

Figure 4:
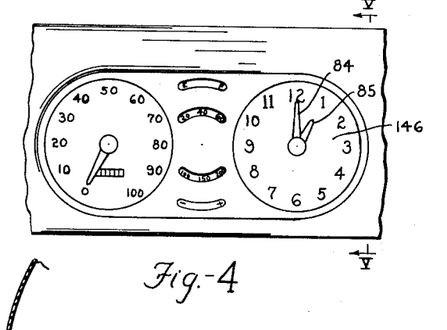
Figure 4 is a front elevational view of a portion of an automobile instrument panel, illustrating the face of a clock unit which may embody elements illustrated in the schematic diagrams of Figures 1-3.
Figure 5:
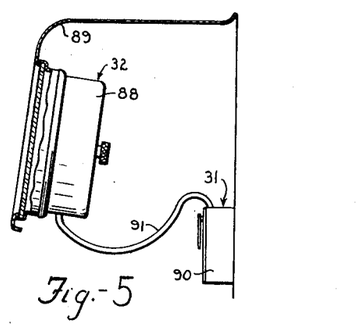
Figure 5 is a cross-sectional elevational view taken substantially along line V—V of Figure 4 illustrating the clock unit coupled through a cable to a control unit, in accordance with the principles of this invention.
Figures 6, 9:
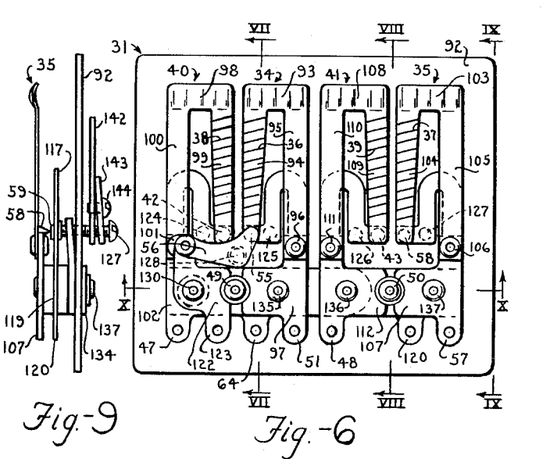
Figure 6 is an inverted rear elevational view of the mechanism of the control unit illustrated in Figure 5 and diagrammatically in Figures 1-3.
Figures 7, 8, 9 and 10 are sectional views taken substantially along lines VII—VII, VIII—VIII, IX—IX and X—X of Figure 6.
Figures 7, 8:
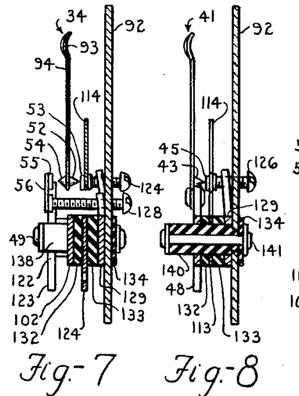
Figure 10:
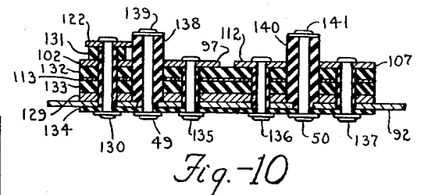

The timer of this invention is particularly well adapted for use as an automobile clock and as shown in Figures 4 and 5, the indicator 32 may take the form of a clock unit in a suitable casing 88 mounted on an automobile instrument panel 89, and the control unit 31 may be mounted in a casing 90 which may be disposed behind the instrument panel 89 and may be connected to the clock unit 32 through a cable 91.

Referring now to Figures 6–12, the part of the control unit 31 may be assembled on a base plate 92 within the control unit housing 90. The bimetal element 34 is preferably of U-shaped configuration to include a bight portion 93, an operating leg portion 94 carrying the contacts 52 and 54 and having the coil 36 wound therearound and a compensating leg 95 secured by a rivet 96 to a plate 97 insulatingly supported from the base plate 92 in a manner as will be described, and having a lug portion forming the terminal 51.

With this construction, the legs 94 and 95 will both be warped by changes in ambient temperature, but such changes will have relatively little effect on the positions of the contacts 52, 54, since the leg 94 is supported from the base plate through the leg 95. Heating of the coil 36 will, of course, warp the leg 94 to change the positions of the contacts 52 and 54 thereon.

It should be noted that the legs 94 and 95 are not exactly the same length and therefore ambient temperature changes will have slight effect on the positions of the contacts 52, 54 (or the pressures between the contacts). The reason for this is that the rate of heat transfer from one substance or body to another is not exactly proportional to the temperature difference therebetween but is also dependent on their temperatures. For example, the rate of heat energy conduction between bodies respectively at 200 degrees F. and 100 degrees F. is generally higher than between the same bodies at 100 degrees and zero, although the temperature difference is the same. The theory underlying this phenomena is that part of the heat is transferred by conduction, proportional to the temperature difference, and part is transferred by radiation which is approximately a function of the fourth powers of the absolute temperatures.

In actual practice, with a wide variation in ambient temperature, for example from minus 20 degrees F. to 150 degrees F., the variation in cooling time under ordinary circumstances might be small. However, this difference may be important in a time-measuring instrument, and it can be compensated for by making the operating leg 94 slightly shorter than the other 95, as shown, so that the cooling time at high and low ambient temperatures remains the same.

The regulator bimetal 40, like the bimetal 34, has a generally U-shaped configuration and includes a bight portion 98, an operating leg portion 99 which carries the contact 42 with the coil 38 being wound therearound, and the compensating leg portion 100 secured by a rivet 101 to a plate 102 which is insulatingly supported from the base plate 92 in a manner as will be described and which has a lug portion forming the terminal 47. The leg portions 99 and 100 coact in the same manner as the leg portions 94 and 95 of the bimetal 34, and the leg portions 99 and 100 may be of slightly different lengths so that the cooling time remains the same independently of any fluctuations in ambient temperature.

The bimetal 35 is of generally U-shaped configuration and includes a bight portion 103, a leg portion 104 carrying the contact 58 with the coil 37 wound therearound, and a leg portion 105 secured by a rivet 106 to a plate 107 having a lug portion defining the terminal 57. The bimetal 41 comprises a bight portion 108, a leg portion 109 carrying the contact 43 with the coil 39 wound therearound, and a leg portion 110 secured by a rivet 111 to a plate 112 having a lug portion defining the terminal 48.

Figure 11:
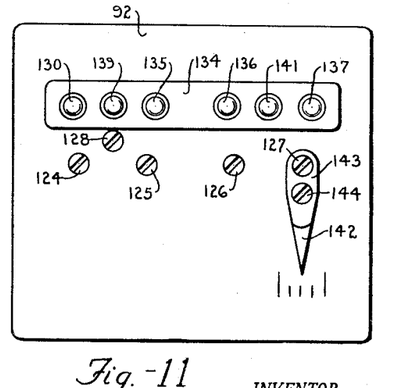
Figure 11 is a front elevational view of the mechanism in Figure 6.
Figure 12:
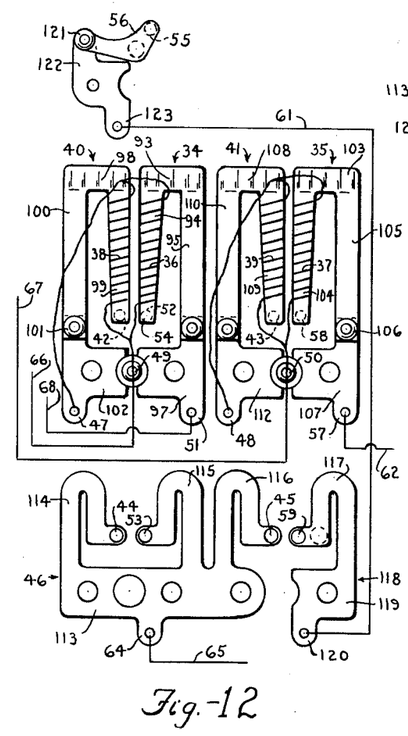
Figure 12 is an assembly view of the mechanism of Figure 6.

As described above in connection with the schematic diagrams of Figures 1-3, the contacts 44, 45 and 53 may be carried by a common plate 46. In the control unit construction of Figures 6-12, the plate 46 has a form which is best illustrated in Figure 12. In particular, the plate 46 has a base portion 113 which, in a manner to be later described, is supported in spaced parallel registering relation to the bimetal support plates 97, 102 and 112, with generally J-shaped portions 114, 115 and 116 projecting from the base portion 113 and respectively carrying the contacts 44, 53 and 45 for registry with the contacts 42, 52 and 43. The purpose of this configuration is to permit adjustment of the positions of the contacts 44, 53 and 45.

The contact 59 is carried at the end of a generally J-shaped arm portion 117 of a plate 118 having a base portion 119 arranged to be supported in spaced parallel registering relation to the support plate 107 for the bimetal 35, the plate 118 having a lug portion 120 forming a terminal for connection of the conductor 61 thereto.

The contact 55 is supported in alignment with the contact 54 by the plate 56 which is secured by a rivet 121 to a plate 122 arranged to be supported in spaced parallel registering relation to the support plate 102 for the bimetal 40 and having a lug portion 123 forming a terminal for connection to the conductor 61.

For adjustment of the positions of the contacts 44, 53 and 59, screws 124, 125, 126 and 127 are threaded through the base plate 92 for engagement with the J-shaped arm portions 114, 115, 116 and 117 adjacent the contacts 44, 53, 45 and 59, respectively. For adjustment of the position of the contact 55, a screw 128 is threaded through the base plate 92 for engagement with a portion of the plate 56 adjacent the contact 55. The screws 124-128 may either be of insulating material, or may have insulated end portions to prevent shorting the contacts to the base plate. Of course, the base plate itself could be of insulating material.

To resist displacement of screws 124-128 in response to shocks and vibrations, a plate 129 is provided having resilient fingers through which the screws 124-128 are threaded, such fingers being biased to increase friction between the engaging threads of the screws, such fingers and the base plate.

For supporting the various plates in assembly, a rivet 130 extends through the plate 122, a spacing washer 131, the plate 102, an insulating plate 132, the base portion 113 of the plate 46, an insulating plate 133, the plate 129, the base plate 92 and an insulating plate 134; a rivet extends through the plate 97, the plate 132, the base portion 113 of the plate 46, the plate 129, the base plate 92 and the insulating plate 134; a rivet 136 extends through the plate 112, the insulating plate 132, the base portion 113 of the plate 46, the insulating plate 134; and a rivet 137 extends through the plate 107, the insulating plate 132, the base portion 113 of the plate 46, the insulating plate 133, the plate 129, the base plate 92 and the insulating plate 134, suitable insulating sleeves being preferably provided on each of the rivets. To prevent angular displacement of the plates 97, 102 and 122, they may be notched to receive a sleeve 138 of insulating material secured by a rivet 139 to the base plate. To prevent angular displacement of the plates 107 and 112, they may be notched to receive a sleeve 140 of insulating material secured by a rivet 141 to the base plate.

It may be noted that the head of the rivet 139 may define the terminal 49 referred to in connection with the schematic diagrams of Figures 1-3, with the ends of the coils 36, 38 being connected thereto through flexible leads as diagrammatically illustrated in Figure 12. Similarly, the head of the rivet 141 may define the terminal 50 to which the ends of the coils 37, 39 may be connected through flexible leads.

Provision may be made for the ready manual adjustment of the position of any one of the contacts 44, 53, 55, 45 or 59 to adjust the time of each cycle, in the event the timer runs slow or fast over a substantial length of time. As indicated diagrammatically in Figures 1-3, the contact 59 may be so adjusted by movement of the pivotal plate 60. However, as described above in connection with the structural embodiment of Figures 6-12, the contact 59 is carried by the plate 118 with the adjustment thereof being effected by the screw 127. To permit ready adjustment of the screw 127, a pair of plates 142 and 143 are threaded on with slight spacing therebetween, and a screw 144 is threaded through the plates 142 and 143 to urge the threaded portions thereof engaged by the screw 127 toward each other and obtain a tight frictional engagement with the screw 127, so that rotation of the plates 142 and 143 will effect rotation of the screw 127. The plate 142 may be pointed and suitable indicia marks may be provided on the base plate 92, as illustrated in Figure 11.

A preferred form of construction of the clock unit 32 is illustrated in Figures 13-20. Referring thereto, a base plate 145 is disposed within the housing 88 with a face plate 146 in front of the base plate 145, conventional indicia on the face plate 146 being visible through a protective glass front plate 147.

The ratchet wheel 83 is secured on the hub 148 which is disposed on a shaft 149 between a bearing member 150 press fitted on the shaft 149 and a collar 151 keyed by a pin 152 on the shaft 149 with a washer 153 between the ratchet wheel 83 and the collar 151, the washer 153 having resilient radially projecting arms urging the ratchet 83 with its hub 148 against the bearing member 150. The bearing member 150 has a reduced diameter end portion 154 journalled in an opening 155 in the base plate 145, to provide the main bearing support for the shaft 149; but in addition, the shaft 149 extends through a portion 156 of a bracket 157 behind the collar 151, the bracket 157 having a base portion 158 secured against the rear face of the base plate 145 by screws 159 and 160. A knob 161 is secured on the rear end of the shaft 149 with a knurled end portion thereof behind the rear face of the housing 88.

The hand 84, which is the minute hand, is press fitted onto the forward end of the shaft 149; and the hand 85, which is the hour hand, is press fitted onto a hub 162 which is journalled on the shaft 149 behind the minute hand 84, the hub 162 carrying the gear 163 which is meshed with a pinion 164 on a shaft 165 journalled on the base plate 145 for rotation about an axis in spaced parallel relation to the axis of the shaft 149. The pinion 164 carries a gear 166 which meshes with a pinion 167 press fitted onto the shaft 149. The relative pitch diameters of the gears and pinions is such that the hour hand 85 makes one complete revolution for each twelve revolutions of the minute hand 84.

As described above in connection with the schematic diagrams of Figures 1–3, a member 86 is arranged to frictionally engage the rachet wheel 83. In the construction illustrated in Figures 13–20, the member 86 may be of generally L-shaped configuration with one leg 168 having its terminal end in engagement with the rear face of the gear wheel 83, and with the second leg 169 secured against a rigidifying member 170, the terminal end of such leg being secured against the base portion 158 of the bracket 157 by the screw 159. The leg 169 and the rigidifying member 170 adjacent the base of the leg 168, the screw 171 being threaded through the base portion 158 of the bracket 157 and being rotatable to adjust the pressure applied between the leg 168 and the ratchet wheel 83.

The electromechanical device 69 described above in connection with the schematic diagrams may preferably have a form as illustrated in Figures 13–20. In particular, the pole or core 72 may be in the form of a bar 172 struck out from an intermediate portion of a plate 173 to provide spaced parallel portions 174 and 175, the portion 174 being secured by screws 176 to a struck-out bracket portion 177 of the base plate 145. The coil 70 is, of course, associated with the portion 172.

The armature 73 may be pivoted at an intermediate point to the plate 173 by a pin 178 extending through the portion 175, then through the armature 73, then through the portion 174.

Figure 13:
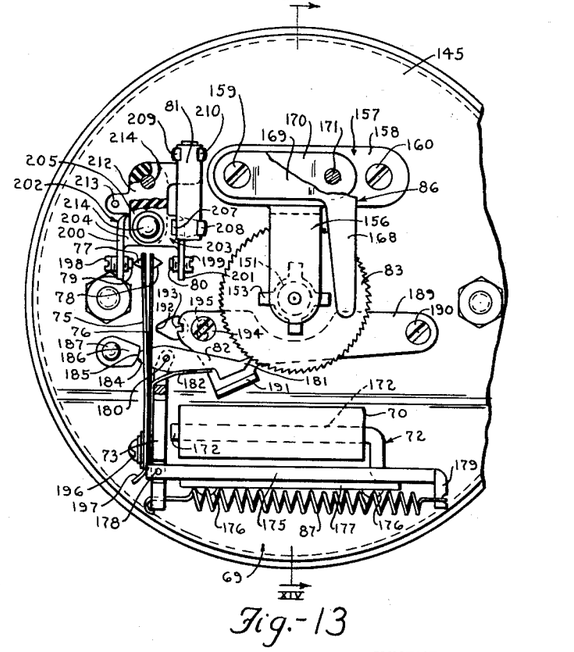
Figure 13 is a rear elevational view of the clock unit of Figures 4 and 5 with the cover plate thereof removed.
Figure 14:
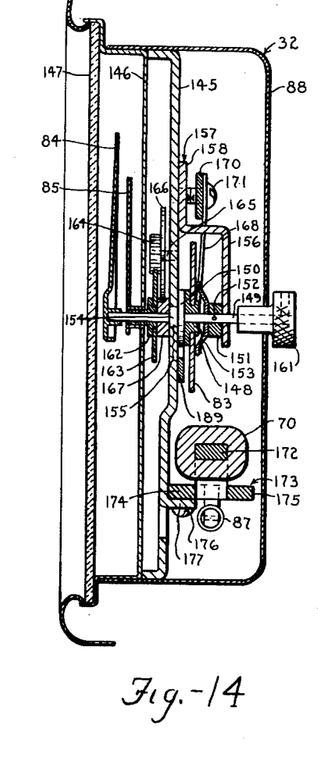
Figure 14 is a sectional view taken substantially along line XIV—XIV of Figure 13.
Figure 15:
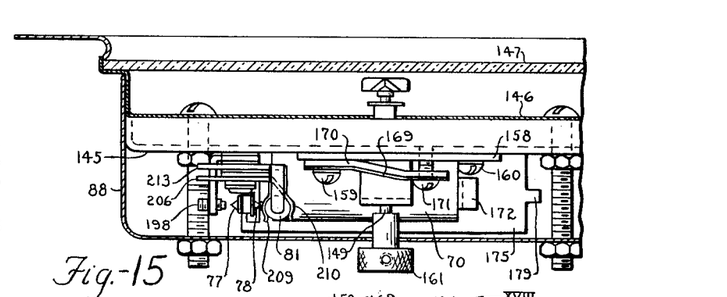
Figure 15 is a top plan view, partly in section, of the clock unit of Figures 5, 13 and 14.
Figure 16:
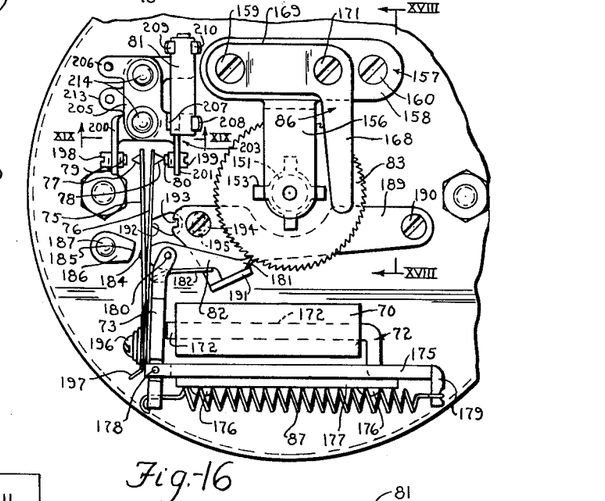
Figure 16 is a view similar to Figure 13, but with certain elements in alternative positions.
Figure 17:
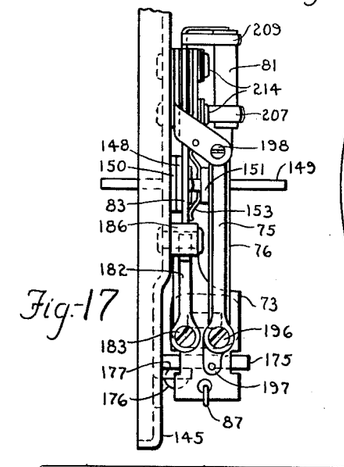
Figure 17 is a side elevational view of the mechanism illustrated in Figure 16.
Figure 18:
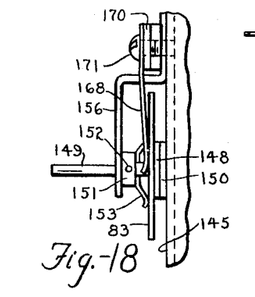
Figure 18 is a vertical section taken substantially along line XVIII—XVIII of Figure 15.
Figure 19:
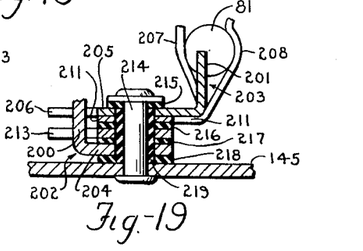
Figure 19 is a sectional view taken substantially along line XIX—XIX of Figure 16.
Figure 20:
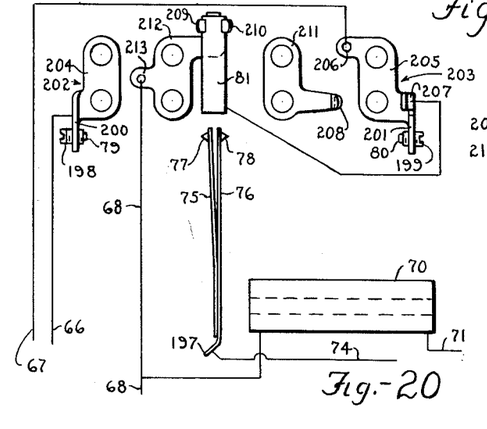
Figure 20 is an assembly view of a switch device used in the clock unit of Figures 13-19.
Figure 21:
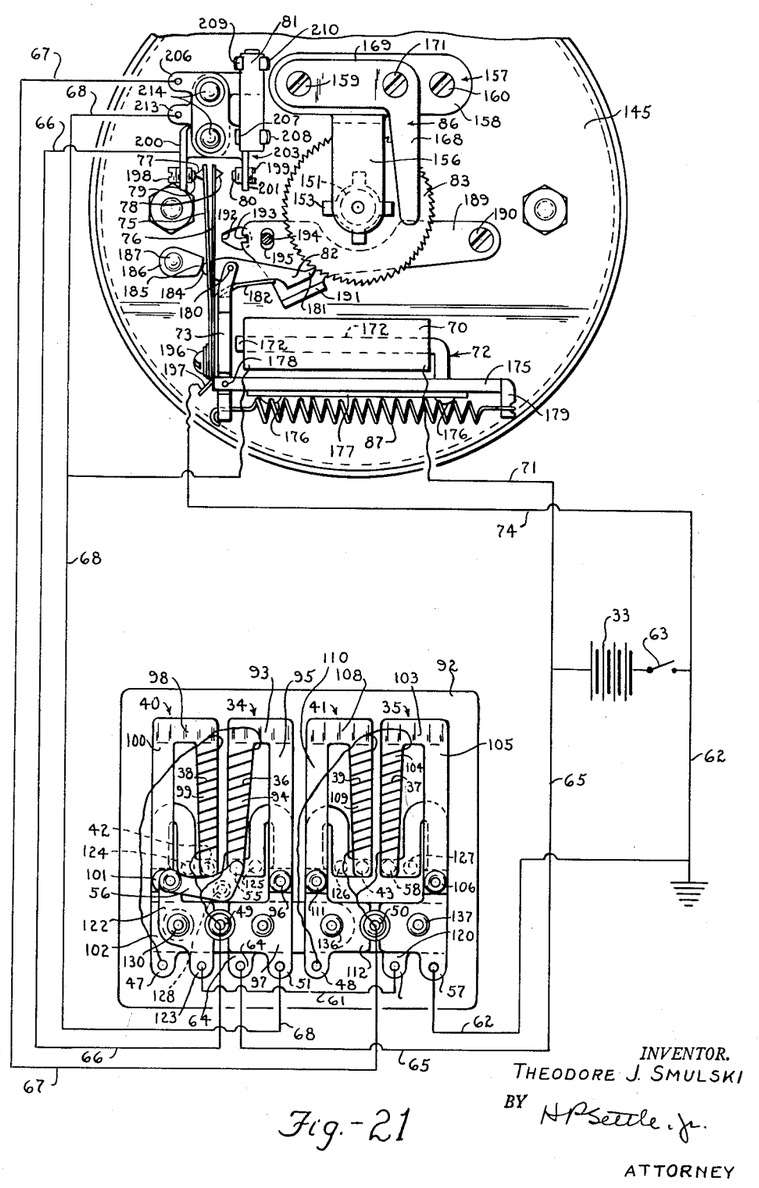
Figure 21 is a view, partly schematic, illustrating how the control unit of Figures 6-12 is electrically connected to the clock unit of Figures 13-20.

One end of the armature 73 (the lower end as illustrated) is connected through a coiled tension spring defining the spring 87 to a downturned lug 179 on the plate 173 to thus urge the armature 73 in a counterclockwise direction as viewed in Figure 13, the armature 73 being rotated in a clockwise direction when the coil 70 is energized.

The other end, the upper end, of the armature 73 is bifurcated to receive a specially shaped member defining the pawl 82, the pawl 82 being pivotally carried on a pin 180. The pawl 82 has a pointed end 181 urged into engagement with the toothed periphery of the ratchet wheel 83 by a leaf spring 182 having a base portion secured along with the switch blades 75 and 76 to the armature 73 by means of a screw 183.

To limit back travel of the pawl 82 when the coil 70 is de-energized, it has a rounded end portion 184, at the end thereof opposite the pointed or detent end 181, which engages a cam surface 185 of a stop plate 186, which may be secured for pivotally adjustable movement on the base plate 145 by a rivet 187.

To limit forward travel of the pawl 82 when the coil 70 is energized, a plate 198 is pivotally secured by a screw 190 against the rear face of the base plate 145 and has a rearwardly projecting flange portion 191 in the path of movement of the pawl 82. To adjust the position of the plate 198 so as to adjust the forward travel of the pawl 82, a screwdriver or the like may be inserted through an opening 192 in the base plate 145 and engaged in a notch 193 in the plate 189 after which the screwdriver may be rotated to rotate the plate 189 to a slight extent. To maintain the plate 189 in an adjusted position, a screw 194 extends through a slot 195 in the plate 189 and is threaded into the base plate 145.

It may here be noted that in the illustrated embodiment, the ratchet wheel 83 has 120 teeth, and the stop plates 186 and 189 are adjusted so that movement of the detent 181 of pawl 82 is equal to the length of one tooth. Since the minute hand 84 rotates with the ratchet wheel 83, and since the coil 70 actuates the pawl 82 once each cycle, the length of each cycle is 30 seconds which is equal to the total cooling time of the bimetals 34 and 35. The cooling time of each bimetal may be 15 seconds or the cooling times may be unequal with the cooling time of one equal to 20 seconds and the cooling time of the other equal to 10 seconds, for example.

The switch blades 75 and 76 which carry the contacts 77 and 78, as described above in connection with the schematic diagrams, are secured to the armature 73 by a screw 196. The portion of the blade 76 adjacent the screw 196 may be formed into a lug 197 for connection of the blades to the conductor 74.

A specific feature of the invention is in the support of the contacts 79 and 80 for engagement with the contacts 77 and 78 carried by the switch arms 75 and 76, and the support of the resistor 81. In particular, the contacts 79 and 80 are formed at the ends of screws 198 and 199 which are threaded through spaced parallel flange portions 200 and 201 of a pair of brackets 202 and 203 having registering base portions 204 and 205 in spaced relation to each other and to the base plate 145 of the clock unit.

The flange portion 200 of the bracket 202 may be apertured for connection of the conductor 66 thereto, and the bracket 203 may have a lug portion 206 apertured for connection of the conductor 67 thereto.

The resistor 81 may be of a removable cartridge type with one end thereof disposed between a pair of clip elements 207 and 208 and with the other end thereof disposed between a pair of clip elements 209 and 210. The clip element 207 may be defined by an integral portion of the bracket 203, and the clip element 208 may be defined by a rearwardly projecting portion of a plate 211 having a base portion registering with and in engagement with the base portion 205 of the bracket 203. The clip elements 209 and 210 are formed on a bracket 212 having a base portion intermediate the brackets 202 and 203 and having a lug portion 213 apertured for connection of the conductor 68 thereto.

To secure the brackets 202, 203, 211 and 212 to the base plate 145 of the clock unit, a pair of rivets 214 extend through insulating washers 215, the base portion 205 of the bracket 203, the plate 211, an insulating spacer 216, the bracket 212, an insulating spacer 218 on the base plate 145, and insulating sleeves 219 being preferably disposed on the rivets 214.

It will, accordingly, be appreciated that this invention provides timing methods and apparatus which are very accurate and reliable in operation, with the component elements being rugged, durable and readily and economically manufactured and assembled.

It will be understood that modifications and variations may be effected without departing from the spirit and scope of the novel concepts of this invention.

I claim as my invention:

1. In a timer or the like, a pair of temperature-responsive means each having a physical characteristic which changes with changes in temperature, means for cyclically and sequentially heating and permitting the cooling of each of said means, and means controlled by changes in said physical characteristics and arranged to respond alternately to the cooling time of one of said temperature-responsive means and thereafter to the cooling time of the other of said temperature-responsive means for registering the number of said cooling cycles of said pair of means, each of said temperature-responsive means being heated while the other is cooling.

2. In a timer or the like, at least two time-controlling temperature-responsive means having a physical characteristic which changes with temperature changes, a secondary regulating temperature-responsive means for each of said first means, electrically interconnected heating means for alternately heating both of said temperature-responsive means to raise the temperature thereof, a circuit for energizing said heating means from an electrical power source, first contact means in said circuit controlled by changes in said physical characteristic of said regulating means for maintaining a flow of energy to said heating means, and register means operative during said de-energized cycle and responsive to changes in said physical characteristic of said time-controlling temperature-responsive means for cyclically energizing and de-energizing said heating means, and means operative during said de-energized cycle and responsive to changes in said physical characteristic produced by the cooling of said time-controlling temperature-responsive means.

3. In a timer or the like, a pair of temperature-responsive means each having a physical characteristic which changes with changes in temperature, a pair of electrical heating means for respectively heating alternates of said temperature-responsive means to a predetermined elevated temperature, a pair of circuits for respectively energizing said heating means, means including an electromechanical device controlled by changes in said physical characteristics resulting from the cooling thereof and responsive only to the sequential cooling of both of said temperature-responsive means to a substantially lower predetermined temperature for interrupting the energizing circuit of the heating means for the other temperature-responsive means, and indicating means intermittently driven in one direction by cyclic operation of said electromechanical device.

4. In a method of timing utilizing a pair of temperature-responsive elements, the steps of continuously and alternately heating one of said pair of elements to maintain a predetermined elevated temperature and thereafter interrupting the heating of said one element to initiate a timing period determined by the time required for said one element to cool to a predetermined lower temperature, heating the other element of said pair to a predetermined elevated temperature during said timing period, and sequentially and periodically interrupting the heating of said other element alternately when said one element attains said lower temperature to initiate another timing period determined by the time required for said second element to cool to a predetermined lower temperature.

5. In a time-measuring device, a plurality of temperature-responsive units, each unit having a physical characteristic which changes with the temperature thereof, means for repeatedly effecting a change in the temperature of said units seriatim from a low to a relatively high initial temperature, including means serving at said high temperature to cyclically dissociate said effecting means from said temperature-responsive units to permit said units to cool off one after another to a final low temperature, and time-registering means under control of said temperature-responsive units and movable incrementally solely in response to the change in said physical characteristic of said units one after the other upon cooling from said initial high temperature to said final low temperature.

6. In a time-measuring device, a plurality of temperature-responsive units, each unit having a physical characteristic which changes with the temperature thereof, means for repeatedly effecting a change in the temperature of said units seriatim from a low to a relatively high initial temperature, including means serving at said high temperature to cyclically dissociate said effecting means from said temperature-responsive units to permit said units to cool off one after another to a final low temperature, means for regulating said initial and final temperatures to compensate for variations in ambient temperature, and means under control of said temperature-responsive units and movable in increments solely in response to the cyclic and sequential change in said characteristic of said units in passing from one extreme of said temperature to the other for registering the number of said cooling cycles.

7. In a clock or the like, a plurality of temperature-responsive means, each having a physical characteristic which changes with temperature changes, there being surrounding structures and substances in heat exchange relation to said temperature-responsive means, means for producing in said temperature-responsive means one after the other an initial relatively high temperature different from the temperature of said surrounding structures and substances, and then allowing transfer of heat from the heated of said temperature-responsive means to said surrounding structures and substances to cool it and lower the temperature of said temperature-responsive means to a final relatively low temperature intermediate said initial high temperature and the temperature of said surrounding structures, and means under control of said temperature-responsive units and movable incrementally solely in response to the change in said physical characteristic of said units one after the other upon cooling from said initial high temperature to said final low temperature for registering the number of said cooling cycles.

8. In a clock or the like, a plurality of temperature-responsive means, each having a physical characteristic which changes with temperature changes, there being surrounding structures and substances in heat-exchange relation to said temperature-responsive means, means for producing in said temperature-responsive means one after the other an initial relatively high temperature different from the temperature of said surrounding structures and substances, including means serving at said high temperature to cyclically dissociate said effecting means from said temperature-responsive means to allow transfer of heat from the heated of said temperature-responsive means to said surrounding structures and substances to cool it and lower the temperature of said temperature-responsive means to a final relatively low temperature intermediate said initial high temperature and the temperature of said surrounding structures, means for regulating said initial and final temperatures to compensate for ambient temperature, including auxiliary temperature-responsive means coupled to each of said first-mentioned temperature-responsive means and having a like physical characteristic which changes with changes in ambient temperature, and means under control of said temperature-responsive units and movable in increments solely in response to the cyclic and sequential change in said characteristic of said units in passing from one extreme of said temperature to the other for registering the number of said cooling cycles.

9. In a time-measuring apparatus, a plurality of temperature-responsive means, each means having a physical characteristic which changes with changes of temperature thereof, means for cyclically effecting a change in the temperature of said means one after another from a low but above ambient to a relatively high initial temperature, including means for maintaining each heated means at said high temperature until the next temperature-responsive means has cooled off to said low temperature, and incrementally movable means under control of said temperature-responsive means and operative upon a combined cooling cycle of said temperature-responsive means for totalizing the cooling cycles thereof.

10. In an electric time-measuring system, first and second thermostats and an electric heater for each thermostat, circuitry for repeatedly energizing said heaters from a current source, including contacts openable and closable by the movement of each of said thermostats to effect energization one after another of said heaters to bring the thermostat of the immediately energized heater to and maintain it at a relatively high temperature above ambient while the second thermostat is being permitted to cool to a final low, a time-registering device adapted to be advanced step by step, an electric actuator for advancing said device, said circuitry further including means to energize said actuator upon cooling of the first thermostat to said final low and to de-energize the heater of the second thermostat, and means under control of said second thermostat when cooled to said low for de-energizing the heater of said first thermostat to permit cooling of the latter and reheating of the second thermostat.

11. In an electric time-measuring system, first and second thermostats and an electric heater for each thermostat, circuitry for repeatedly energizing said heaters from a current source, including contacts openable and closable by the movement of each of said thermostats to effect energization one after another of said heaters to bring the immediately energized thermostat to and maintain it at a relatively high temperature above ambient while the second thermostat is being permitted to cool to a final low, a time-registering device adapted to be advanced step by step, an electromechanical actuator for advancing said device, said circuitry further including means to energize said actuator upon cooling of the first thermostat to said final low, an auxiliary holding circuit for said actuator energized upon actuation of said actuator, and means under control of said second thermostat when cooled to said low for de-energizing said holding circuit and the heater of said first thermostat to permit cooling of the latter and reheating of the second thermostat.

References Cited in the file of this patent

UNITED STATES PATENTS

| | | |
|---|---|---|
| 1,335,709 | Bjornsen | Mar. 30, 1920 |
| 1,468,179 | Sutton | Sept. 18, 1923 |
| 2,009,601 | Anderson | July 30, 1935 |
| 2,539,185 | Dayton | Jan. 23, 1951 |
| 2,553,829 | Mohn | May 22, 1951 |
| 2,564,321 | Brosseau | Aug. 14, 1951 |
| 2,572,162 | Koonz | Oct. 23, 1951 |
| 2,601,174 | Smith | June 17, 1952 |
| 2,660,030 | Santos | Nov. 24, 1953 |
| 2,711,501 | Contant | June 21, 1955 |
| 2,762,997 | Boddy | Sept. 11, 1956 |

UNITED STATES PATENT OFFICE
CERTIFICATION OF CORRECTION

Patent No. 2,978,861            April 11, 1961

Theodore J. Smulski

It is hereby certified that error appears in the above numbered patent requiring correction and that the said Letters Patent should read as corrected below.

Column 3, line 57, for "apparnet" read -- apparent --; column 4, line 60, after "drawing" strike out the comma; column 7, line 16, for "counter clockwise" read -- counterclockwise --; column 10, line 56, for "throught" read -- through --; column 11, line 7, after "44" strike out the comma; lines 17 and 18, for "55 (Figure 3)," read -- 55, (Figure 3) --; same column 11, line 74, after "while" insert -- de-energizing the circuit through the coils 37-39. Ac- --; column 12, line 42, for "part" read -- parts --; column 17, line 6, after "means," insert -- means including second contact means in said circuit controlled by changes in said physical characteristic of said time-controlling temperature-responsive means for cyclically energizing and de-energizing said heating means, --; same column 17, line 8, beginning with "of said time-controlling", strike out all to and including "characteristic" in line 12, same column 17.

Signed and sealed this 5th day of December 1961.

(SEAL)
Attest:

ERNEST W. SWIDER            DAVID L. LADD Attesting Officer            Commissioner of Patents